United States Patent [19]

McGriff

[11] Patent Number: 5,297,354
[45] Date of Patent: Mar. 29, 1994

[54] APPARATUS FOR APPLYING BAIT OIL TO A FISHING LURE

[75] Inventor: Alvin J. McGriff, Fort Myers, Fla.

[73] Assignee: Donabelle F. McGriff, Fort Myers, Fla.

[21] Appl. No.: 932,225

[22] Filed: Aug. 19, 1992

[51] Int. Cl.$^5$ .................................................. A01K 97/00
[52] U.S. Cl. ......................................... 43/4; 43/54.1; 43/55
[58] Field of Search ................. 43/4, 25, 25.2, 54.1, 43/55; 206/315.11; 224/920

[56] References Cited

U.S. PATENT DOCUMENTS

| 4,418,490 | 12/1983 | Ancona | 43/25.2 |
| 4,501,222 | 2/1985 | Stone | 43/25 |
| 4,527,350 | 7/1985 | Tockey, Jr. | 43/54.1 |
| 4,771,564 | 9/1988 | Whitley | 43/4 |
| 5,097,616 | 3/1992 | Johnston, Jr. | 43/4 |

*Primary Examiner*—Kurt Rowan
*Attorney, Agent, or Firm*—William E. Noonan

[57] ABSTRACT

An apparatus is provided for applying bait oil to a fishing lure. The apparatus includes a flexible pouch assembly having an interior compartment formed therein. An absorbent applicator lines the compartment and is secured therein to the pouch assembly for holding bait oil. A flexible closure is attached to the pouch assembly for selectively covering and uncovering the compartment. A fishing lure is introduced into the compartment and the exterior surface of the pouch assembly is squeezed to press the applicator against the lure and apply bait oil to the lure. A method for applying bait oil to a fishing lure, utilizing the above apparatus, is also disclosed.

8 Claims, 2 Drawing Sheets

APPARATUS FOR APPLYING BAIT OIL TO A FISHING LURE

FIELD OF THE INVENTION

This invention relates to a pouch-like apparatus for applying scented bait oil, such as worm or crawfish oil, to a fishing lure.

BACKGROUND OF THE INVENTION

When an angler handles a rubber or plastic fishing lure, he tends to impart a human scent onto the lure. This scent frightens fish and therefore interferes with successful fishing. Accordingly, experienced fisherman typically apply an appropriate scented bait oil, such as worm oil or crawfish oil, to the lure before it is cast into the water. This substance masks the human scent and, as a result, fishing is improved.

Conventionally, bait oil is squirted or sprayed from a bottle onto the bait. This is usually a messy and wasteful operation. Excess oil can spill onto the boat and into the water. As a result, it can pollute the environment. Moreover, bait oil is apt to stain hands, clothing and the carpeting of the boat. Spraying bait oil onto the lure is also highly inefficient because so much of the substance misses the bait and is wasted. And crawfish oil, in particular, attracts insects. Accordingly, when such oil spills, it is important that the affected area be thoroughly and promptly cleaned.

SUMMARY OF INVENTION

Accordingly, it is an object of this invention to provide an improved apparatus for applying scented bait oil, such as worm and crawfish oil, to a fishing lure.

It is a further object of this invention to provide an apparatus for quickly and efficiently applying bait oil without wasting that substance;

It is a further object of this invention to provide an apparatus that applies bait oil to a fishing lure without spilling the oil and polluting the environment or damaging the boat or its carpeting.

It is a further object of this invention to provide a bait oil applicator, which reduces the attraction of insects and messy cleanup often caused by spilling the oil.

This invention features an apparatus for applying bait oil to a fishing lure. The apparatus includes a flexible pouch assembly having an interior compartment formed therein. An absorbent applicator lines the compartment and is secured therein to the pouch assembly. Accordingly, employing this apparatus, a fishing lure is introduced into the compartment and the exterior surface of the pouch assembly is squeezed to press the applicator against the lure and apply bait oil to the lure.

In a preferred embodiment a flexible closure selectively covers and uncovers the compartment. The closure may include a flap permanently fixed to the pouch assembly and further including means for releasably fastening a section of the flap to the pouch assembly to cover the compartment. The means for releasably fastening may include complementary hook and loop fasteners, one of which is attached to the flap and the other of which is attached to the pouch assembly.

The applicator may include a resilient foam. Preferably the applicator is secured to the pouch assembly by an adhesive.

Means, carried by the pouch assembly, may also be provided for anchoring the apparatus to a fixed object. The means for anchoring may include a flexible line that is fixed at one end to the pouch assembly and includes, at its opposite end, means for forming a loop to engage the fixed object.

A method is also disclosed for applying bait oil to a fishing lure. An apparatus, as described above, is provided and bait oil is introduced into the absorbent applicator. The lure is then introduced into the compartment and the exterior surface of the pouch assembly is squeezed to press the applicator against the lure and apply bait oil to the lure.

DETAILED DESCRIPTION OF PREFERRED EMBODIMENT

Other objects, features and advantages will occur from the following description of preferred embodiments and the accompanying drawings, in which.

Figure 1:
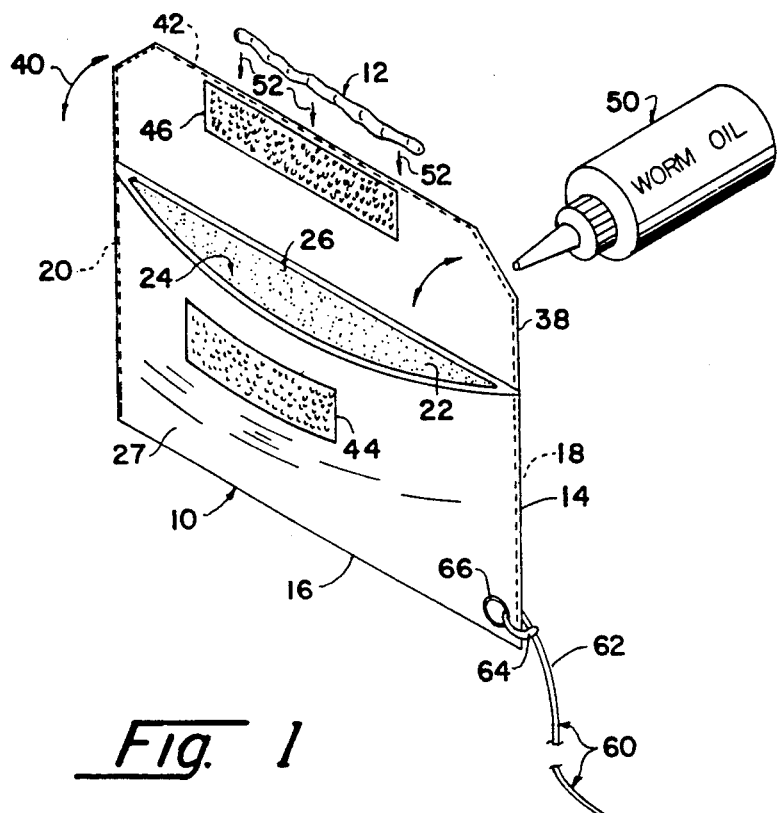
FIG. 1 is an perspective view of an apparatus for applying bait oil to a worm or other type of fishing lure.

A bait oil applicator apparatus, according to this invention, is constructed by lining the interior compartment of a flexible pouch assembly with an absorbent applicator for holding bait oil. The flexible pouch may be shaped and constructed in a manner similar to an eyeglass or tobacco pouch. Typically, the pouch assembly is constructed of vinyl, leather or other suitable material. Preferably, the pouch should be durable, lightweight and somewhat water resistent.

The absorbent applicator preferably comprises a resilient foam or similar material. It is cut to a size and shape that fit within the compartment of the pouch assembly. In most cases, a single sheet of foam is used and the foam is inserted into the pouch assembly by folding it and introducing it into the compartment. A suitable adhesive, such as waterproof tac glue, is typically used to secure the absorbent liner within the pouch assembly.

A flexible closure is provided for selectively covering and uncovering the compartment. Preferably, the closure includes a flap that is permanently fixed to the pouch assembly, also in the manner of an eyeglass or tobacco pouch. Preferably, the flap is permanently fixed to the pouch assembly and a distal section of the pouch is releasably secured to the pouch assembly by suitable fastening means such as complementary hook and loop (Velcro) elements. This construction permits the flap to be selectively opened and closed.

A flexible line or other means may be attached to the pouch assembly for selectively anchoring the applicator apparatus to a relatively fixed object. Such means may include a flexible cord that is secured to a corner of the pouch assembly and has at its opposite end a clip that selectively engages the line to form a loop for engaging the relatively fixed object.

This invention also features an improved technique for applying bait oil to the fishing lure. Specifically, the bait oil is introduced into the above-described absorbent applicator. This bait oil may include worm oil or crawfish oil, as appropriate. A lure such as a worm or crawfish is then introduced into the compartment. Next, the exterior surface of the pouch assembly is squeezed to press the applicator against the lure. As a result, the bait oil is applied to the lure. Finally, when the bait oil is fully coated, the flap is opened and the lure is removed from the pouch.

A lure that has been coated with bait oil in the above manner is then ready to be engaged by the fishing rig or hook and used for fishing. The bait oil masks the human scent on the lure and provides for a much more effective lure that is not as likely to frighten fish. By employing the pouch of the subject invention, a number of problems are overcome. Specifically, the bait oil is applied neatly and efficiently to the applicator within the pouch assembly. As a result, waste is reduced and money is saved. Additionally, oil spray and drippings that can stain the fisherman's hands, pollute the environment and cause damage to the boat or fishing equipment are greatly reduced. Moreover, use of this apparatus is particularly helpful in eliminating ants and other insects when crawfish oil is used. Normally, such pests are attracted to crawfish the oil that spills on the boat or its environs. By preventing such spillage, insects and annoying clean-ups are virtually eliminated.

There is shown in FIG. 1 an apparatus 10 for applying bait oil to a worm or other fishing lure 12. Apparatus 10 includes a generally rectangular pouch assembly 14 that is composed of a flexible material. More particularly, pouch assembly 14 is defined by a sheet of leather or vinyl that is folded in half along a bottom edge 16. The sides of the folded material are joined, as indicated by stitching 18 and 20 and the upper end 22 includes an opening into an interior compartment 24.

An absorbent applicator 26, formed by a piece of resilient foam, lines the interior of compartment 24 and is secured to the inside surfaces of pouch assembly 14 by a suitable waterproof adhesive. Forward wall 27 of assembly 14 is separated from the rearward wall of the pouch and foam applicator 26 is introduced into pouch compartment 24, in the manner shown in FIG. 2. In particular, applicator 26 is folded along line 28 and introduced in the direction of arrows 30 into the pouch assembly. Before applicator 26 is inserted into the pouch, a suitable tac glue or other waterproof adhesive 32 is applied to the outer surfaces 34 and 36 of applicator 26. The applicator is then inserted within the pouch and pressed against the walls of the compartment to secure the applicator within the compartment.

Figure 2:
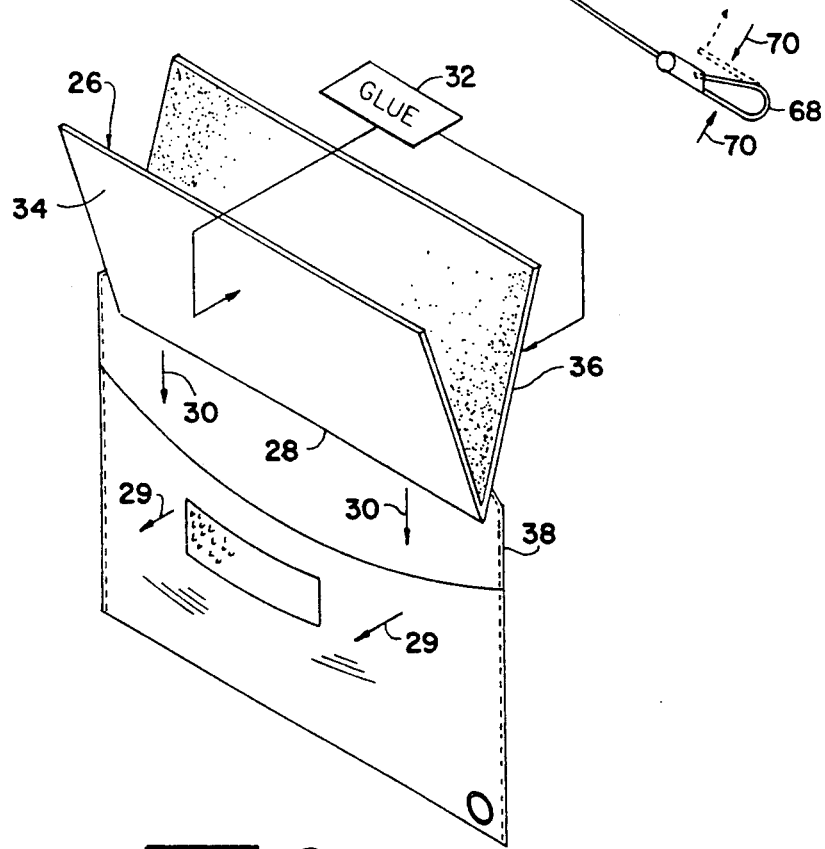
FIG. 2 is an a perspective view illustrating the insertion of the absorbent applicator into the pouch assembly.

As shown in FIGS. 1 and 2, a flexible closure or flap 38 is permanently, and typically integrally, connected to the upper edge of the rearward wall of pouch assembly 14. Flap 38 is flexibly secured to the pouch assembly and, as a result, opens and closes as indicated by doubleheaded arrow 40, FIG. 1. The distal edge of flap 38 is provided with stitching 42. With flap 38 in the open condition, ready access is provided to pouch compartment 24 and foam applicator 26. With flap 38 in the closed position, FIG. 3, the interior compartment of the pouch is covered.

Figure 3:
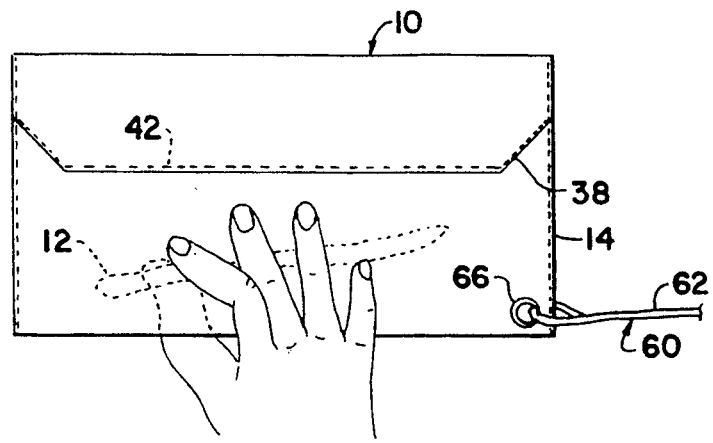
FIG. 3 is an elevational view of the apparatus with the pouch assembly closed and further illustrating a preferred technique for applying oil to a lure contained within the pouch assembly.

Means are employed to releasably fasten flap 38 in the closed condition shown in FIG. 3. For example, as shown in FIG. 1, such means may include complementary hook and loop elements. A hook element 44 is secured to the outside surface of pouch assembly wall 27, just below open upper end 22. A complementary loop element 46 is likewise secured to the inside surface of flap 38. Hook and loop elements 44 and 46 are secured as shown by a suitable adhesive, stitching or other means. To fasten flap 38 in a provisionally closed position, the flap is simply lowered over opening 22 and loop element 46 is engaged with hook element 44. The flap may then be opened by simply pulling apart the hook and loop elements 44 and 46. In alternative embodiments, snap or button fastening elements may be employed for releasably securing the flap in its closed condition.

In operation, flap 38 is opened into the position shown in FIG. 1 and the upper edges of pouch assembly 14 are separated somewhat to expose compartment 24. Worm oil 50 (or other suitable scented bait oil) is then squirted or sprayed into the pouch assembly compartment 24 wherein it is absorbed by resilient foam applicator 26. The pouch and compartment provide conveniently and cleanly hold for the worm oil and prevent that product from being spilled or dripped on the boat or the user's hands. The worm oil is spread evenly throughout the applicator and then a worm 12 or other type of bait is introduced into the pouch compartment, as illustrated by arrows 52. More particularly, worm 12 is interposed between the folded surfaces of the liner/applicator 24. Flap 38 is then fastened closed, as shown in FIG. 3. The user squeezes together the outer surfaces of the pouch assembly 14 such that the resilient foam is pressed against and about the worm 12 received within the pouch assembly compartment. This applies the worm oil carried within the resilient foam to the worm 12. The user continues to manipulate the pouch assembly in this manner until worm oil is applied evenly about the entire worm. Due to the slipperiness of the oil on the bait, the experienced fisherman determines relatively quickly when that oil is fully applied.

After application is completed, the flap 38 is reopened and worm 12 is removed from the pouch assembly. The pouch assembly may then be reclosed by reengaging the Velcro fastening components. Subsequently, apparatus 10 can be reused to apply worm oil to additional lures, as required.

In alternative embodiments, flap 38 need not be closed. In fact, in certain embodiments no flap at all is required.

Figure 4:
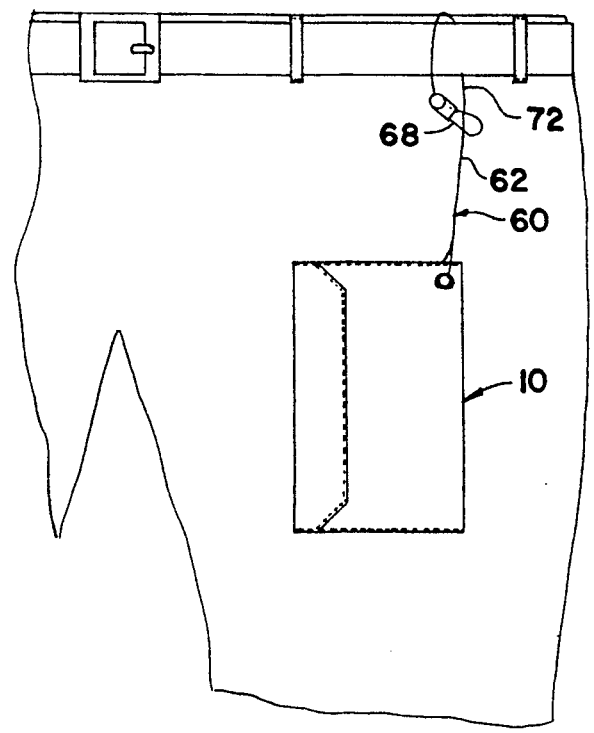
FIG. 4 is an elevational view of the apparatus of this invention secured, while not in use, to a fisherman's belt.

A flexible anchoring apparatus 60, FIGS. 1, 3 and 4, may be utilized to secure apparatus 10 to a relatively fixed object so that the apparatus is not lost between uses. In particular, anchoring device 60 includes a flexible line or cord 62 that is secured by an appropriate loop and knot 64 to a circular grommet 66 in a lower corner of pouch assembly 14. The opposite end of line 60 is secured to a conventional spring clip 68. By applying pressure to the clip, as indicated by arrows 70 in FIG. 1, the clip opens, as shown in phantom. This permits clip 68 to engage line 62 in the manner shown in FIG. 4. The clip is then reclosed to form a loop 72. This loop is engaged with a relatively fixed object such as the user's belt, or some structure connected with the trolling motor or the boat. In this manner, apparatus 10 remains securely fastened to the relatively fixed object and will not be lost between uses.

In alternative embodiments various other types of anchoring devices may be utilized. For example, the flap may be used to secure the pouch to the control cable of the trolling motor.

Although specific features of the invention are shown in some drawings and not others, this is for convenience only, as each feature may be combined with any or all of the other features in accordance with the invention.

Other embodiments will occur to those skilled in the art and are within the following claims.

What is claimed is:

1. An apparatus for applying bait oil to a fishing lure, said apparatus comprising:
   a flexible pouch assembly having a plurality of interconnected walls composed exclusively of a relatively pliable material, each wall having an interior surface and an opposite, fully exposed exterior surface that is directly engagable by a person's fingers, and an interior compartment formed between said walls, said pouch further having four elongate sides, three of said sides being sealed closed and the fourth said side being open to permit access into said compartment; and
   an absorbent applicator that lines said compartment and is secured therein to said interior surfaces of said walls for holding bait oil; whereby a fishing lure is introduced into said compartment and said exterior surfaces of said pliable walls deformably squeezed to press said applicator against said lure and apply bait oil to said lure.

2. The apparatus of claim 1 including a flexible closure attached to said pouch assembly for selectively covering and uncovering said compartment.

3. The apparatus of claim 2 in which said closure includes a flap permanently fixed to said pouch assembly and further including means for releasably fastening a section of flap to said pouch assembly to cover said compartment.

4. The apparatus of claim 3 in which said means for releasably fastening include complementary hook and loop fasteners, on of which is attached to said flap and the other of which is attached to said pouch assembly.

5. The apparatus of claim 1 in which said applicator includes a resilient foam.

6. The apparatus of claim 1 in which said applicator is secured to said pouch assembly by an adhesive.

7. The apparatus of claim 1 further including means carried by said pouch assembly for anchoring said apparatus to a relatively fixed object.

8. The apparatus of claim 7 in which said means for anchoring include a flexible line that is fixed at one end to said pouch assembly and includes at its opposite end means for forming a loop to engage said fixed object.

* * * * *